(12) United States Patent
Chang et al.

(10) Patent No.: US 6,387,275 B1
(45) Date of Patent: May 14, 2002

(54) PRETREATMENT SYSTEM AND METHOD FOR RECYCLING EXHAUST WATER

(75) Inventors: Chen-Chang Chang; Shih-Cheng Lin; Hsing-Fen Tsai, all of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/625,981

(22) Filed: Jul. 26, 2000

Related U.S. Application Data

(62) Division of application No. 09/345,423, filed on Jul. 1, 1999.

(51) Int. Cl.⁷ .................................................. C02F 1/52

(52) U.S. Cl. ........................ 210/712; 210/723; 210/738; 210/805

(58) Field of Search ................................. 210/712, 723, 210/738, 805

(56) References Cited

U.S. PATENT DOCUMENTS

| | | | | |
|---|---|---|---|---|
| 4,176,058 A | * | 11/1979 | Grobler | |
| 5,409,616 A | * | 4/1995 | Garbutt et al. | |
| 5,547,569 A | * | 8/1996 | Spencer | |
| 5,904,855 A | * | 5/1999 | Manz et al. | |

* cited by examiner

Primary Examiner—Betsey Morrison Hoey
(74) Attorney, Agent, or Firm—Dougherty & Troxell

(57) ABSTRACT

A pretreatment system and a pretreatment method for recycling exhaust water, for purifying exhaust water to a water quality acceptable to ordinary water-purification equipment, has advantages of small space occupation, low energy consumption, and lower cost. By providing a mixing piping with coarse interior, a series of closed micro continuous stirred tank reactors can be established inside the pipe to form plenty of turbulent regions for thoroughly mixing the chemical and the exhaust water. Flocculent gels that carry pollutants and particles of the exhaust water then can be removed by a filtering unit, for purifying the exhaust water. Also, by providing a modified silt density index, the pollution of a sample water can be clearly scaled and monitored.

13 Claims, 5 Drawing Sheets

PRETREATMENT SYSTEM AND METHOD FOR RECYCLING EXHAUST WATER

RELATED APPLICATION

This is a Divisional application of U.S. Ser. No. 09/345,423, filed Jul. 1, 1999, entitled PRETREATMENT SYSTEM AND METHOD FOR RECYCLING EXHAUST WATER, and currently pending.

BACKGROUND OF THE INVENTION (1) Field of the Invention

The invention relates to a pretreatment system and method for recycling exhaust water, and more particularly to a system and method which can remove a substantial amount of silt or contamination in the exhaust water before forwarding the water into a water-purification equipment.

(2) Description of the Prior Art

For most countries, all-aspect management and reasoned allocation on domestic water resources are a crucial topic to all kinds of nations for ensuring continuing prosperity of economic development. To the authority, it is important to establish a complete package of regulations and laws, and also to carry out a solid plan of public elementary construction leading to form a complete reservation and utilization network of the domestic water resources. On the other hand, to the private institute and ordinary family, the policy for utilizing the water is to save the money without violating the laws.

As the economics grow, the need for the utility water is increased as well. In general, the conventional water-supply pattern that supplies water from the reservoirs directly into the water-consumed party is no more an if-and-only if condition that can guarantee sufficient supply of water. Especially in the district that locates intensively a lot of semi-conductor manufacturing factories or other water-consumed industries, an increasing need for stable utility water supply becomes an important issue that can never be neglected and needs to be resolved immediately.

Generally speaking, there are two measures to resolve the water shortage problem; one is to dig out more nature water resources, and another is to save the water consumption. However, in the case that the former measure is employed, it usually implies that huge budget, laboring, and time need to be involved. Apparently, that resolving the water shortage problem by further sourcing can meet the urgent need from the industries. Also, the uncertainty for large-scaled construction is usually high and makes the work unpredictable. On the other hand, the latter measure can be carried out immediately at the consumer end, and seems to be feasible to meet short-term shortage. Usually, the latter measure includes at least two resorts, cutting down the water usage and/or recycling the exhaust water.

To evaluate possible resolutions to save the water consumption, it is evident that, by cutting down the water usage, the freedom of using water is usually sacrificed and inconvenience in the normal living operation is also inevitable. On the other hand, it is believed that recycling the exhaust water is a better way nowadays to resolve the water shortage problem, especially for those industries using plenty of water. The basic idea to recycle exhaust water is to utilize a water-purifying process to revitalize the exhaust water back to an acceptable quality level compared to the water that is directly supplied from a reservoir. For industries, by recycling the exhaust water, the external water need can be greatly reduced and the manufacturing can be much controllable.

The present invention is an effort on providing an method and a system for recycling the exhaust water. The exhaust water can be the water from a texture factory, from the oceans, or from a contaminated or half-salted well. The technical fields related to the present invention include exhaust water treatment, water-purification process, and water quality-monitoring method. Following are brief introductions upon these three fields.

A. Exhaust Water Treatment

Conventionally, to improve the quality of exhaust water to a releasable level, it is usually seen that bio-treatment, chemical mixing, or active carbonating is used to de-contaminate the exhaust water before discharged to the oceans. Among these treatments, chemical mixing is the most popular method to apply, in which chemicals are used to mix with the exhaust water for forming filterable flocculent gels. Generally, chemical mixing process can be classified to a rapid mixing (or coagulation) and a slow mixing (or flocculation). The rapid mixing can have the benefit of thoroughly blending the chemicals and the exhaust water, and the slow mixing can have more processing time to allow the flocculent gels growing.

In conventional rapid mixing equipment, the reactor is an open continuous stirred tank reactor (CSTR), shaped as a cylindrical tank or a rectangular tank In the tank, the chemicals and the exhaust water are forced to mix and form a plurality of flocculent gels. However, CSTR provides an open system that is vulnerable to the ambience. Rain, sand, or other particles can contaminate further the exhaust water in the tank. Also, due to a large volume of the tank, a dead volume that cannot be reached by the stirred flow in the tank does always exist. Conventional measures to resolve this disadvantage are to increase the stirring capacity, to modify the interior of the tank for enhancing the turbulence inside the tank, and to adjust the amount and the ingredients of the chemicals. Nevertheless, any aforesaid resort does lead to the increase of the cost.

On the other hand, a conventional plug flow reactor (PFR) provides a closed pipe flow for mixing the chemicals and the exhaust water. The PFR does not include any stirring mechanism, so that the energy consumed can be reduced. However, in the PFR, the pipe-flow mixing of the chemicals and the exhaust water is inferior to that in a CSTR; so that the PFR is seldom seen in industrial practice.

B. Water-purification Process

The water-purification process is to filter out the minerals, bacteria, silt, and other pollutants in the water; for improving the water quality to an acceptable level compared to a drinking water. Equipment for this purpose includes an active carbon water-purification facility, a reverse osmosis system, or the like. However, ordinary water-purification equipment is usually aimed at purifying the water directly supplied from an external water pipe, not at treating the internal exhaust water. Thus, if applying conventional water-purification equipment directly to purify the exhaust water, plenty of energy and cost are usually needed for successfully completing a treating target; for the exhaust water is not the design object for such equipment to handle.

B. Water Quality-monitoring Method

Conventionally, a silt density index (SDI) is usually provided to evaluate the water quality. SDI can be derived as follows.

$$SDI = \left(\frac{1 - \frac{t_0}{t_{15}}}{15}\right) \times 100$$

where $t_0$ is the duration for a 500-ml sample water to pass a 0.45-μm standard membrane, and $t_{15}$ is the duration after a first 15-minute operational time for another 500-ml sample water to pass the standard membrane.

Though the SDI numbering can be effectively used to show the pollution of source water, yet it is incapable of showing the silt density difference among various exhaust waters. Empirically, while the sample water is filled with particles sized to 0.45–1.00 μm, the standard membrane will be rapidly jammed and allow only extreme little water to pass through. As a consequence, the $t_{15}$ will go extreme big, and make the SDI value reach its 6.67 upper bound. Therefore, regarding the exhaust water, the SDI is not a relevant scale to distinguish the pollution degree.

Further, the trend of the water-managing policy worldwide is led to persuade a higher recycle rate of exhaust water. For example, in Taiwan, a 1998 national conference on water resources has proposed to increase the enforced recycle rate of exhaust water to 65%, from a 31% previous rate By raising the enforced recycle rate of exhaust water, the industry does not only need to improve the water-purification equipment, but also need to retreat any possible internal exhaust water. Hence, to provide a pretreatment system and a method for recycling exhaust water before conventional water-purification equipment is extremely important, and has obvious advantage on cost down and meeting the government's regulation

SUMMARY OF THE INVENTION

Accordingly, it is an object of the present invention to provide a pretreatment system and a pretreatment method for recycling exhaust water, which can purify the exhaust water to a water quality acceptable to ordinary water-purification equipment.

It is yet another object of the present invention to provide a pretreatment system and a pretreatment method for recycling exhaust water, in which a mixing piping with rough interior is applied to simulate a series of close micro CSTR's for thoroughly blending the exhaust water and doping chemicals.

It is a further object of the present invention to provide a modified silt density index, which can be used to effectively monitor the pollution variation upon various exhaust water samples.

The pretreatment method for recycling exhaust water in accordance with the present invention is used to purify the exhaust water and to generate clean water for further supplying to a water-purification equipment. The pretreatment method comprises:

(A) Introducing the exhaust water and adding a substantial amount of chemicals to form a gel water;
(B) Flowing the gel water through a mixing piping, in which the gel water is stirred by a plurality of turbulent structures located inside the mixing piping for forming a plurality of flocculent gels;
(C) Leading the gel water through a filtering unit for filtering out the flocculent gels of the gel water and forming the output clean water; and
(D) Introducing the clean water to the water-purification equipment.

According to the present invention, the chemicals used in step (A) can be $Al_2(SO_4)_3 \cdot 18H_2O$, PAC, $FeCl_3$, and any chemical available in the art.

According to the present invention, the turbulent structures located inside the mixing piping in step (B) is used to simulate a series of in-pipe micro CSTR's for forming a series of turbulent regions to thoroughly mix the exhaust water and the chemicals. The turbulent structures can be achieved by providing coarse interior to the mixing piping. Preferably, the mixing piping can be formed by worm pipes. Cross sections for the worm pipes can be a block-wave pattern, a sinusoidal-wave pattern, a triangular-wave pattern, or any pattern the like.

According to the present invention, in step (B) for providing in-pipe shearing to assist the stirring between the chemicals and the exhaust water, the mixing piping can be arranged to have a repeatedly bent appearance, or to surround the exterior of the filtering unit.

Preferably in the step (B), the duration for the gel water to flow through the mixing can be between 5 and 60 seconds.

In one embodiment of the pretreatment method for recycling exhaust water, the mixing piping in step (B) can be made as a pipe filled with interior stuffing for preventing laminar flow inside the pipe.

In one embodiment of the pretreatment method for recycling exhaust water, the filtering unit in step (C) can be an auto reverse-washing multi-media sand tank or the like filtering device. Typically, the sand tank can have three layers: a 5 mm–20 mm pebble bottom layer, a 1 mm–3 mm coarse crystal sand middle layer, and a 0.5 mm–1.5 mm fine crystal sand upper layer. The gel water is firstly introduced to the bottom layer, through the middle layer, and finally flows out of the tank from the upper layer.

In one embodiment of the pretreatment method for recycling exhaust water according to the present invention, an additional step (B1) can be processed between the step (B) and the step (C), which the step (B1) is to lead the gel water through a buffer tank for growing the flocculent gels in the gel water. In the buffer tank slow mixing of the chemical and the exhaust water is processed for a substantial duration of time. Preferably, the gel water is introduced into the buffer tank by a tangential direction; so that the gel water can circulate gradually inside the buffer tank. Preferably, the gel water is led into the buffer tank from a bottom thereof and led out of the buffer tank from a top thereof. In the embodiment, the buffer tank can be a cylindrical tank with a diameter-to-height ratio between 1 and 0.1. The gel water is preferably to flow in the buffer tank for 1 to 10 minutes.

In one embodiment of the pretreatment method for recycling exhaust water according to the present invention, an additional step (C1) can be processed between the step (C) and the step (D), which the step (C1) is to lead the gel water through at least a filter for protecting the water-purification equipment. The filter can include only a 5-μm filter, or a 5-μm filter and a 1-μm filter.

The pretreatment system for recycling exhaust water, which is established to carry out the pretreatment method for recycling exhaust water in accordance with the present invention, can include:

an inlet piping, having a first inlet end for introducing the exhaust water into the inlet piping and a first outlet end;
a doping unit, for adding chemicals into the inlet piping to mix with the exhaust water for forming a gel water;
a mixing piping, having a second inlet end fluidly connected with the first outlet end of the inlet piping and a second outlet end, the mixing piping including coarse interior for generating a plurality of turbulent mechanism to form turbulent flow inside the mixing piping for helpfully promoting a plurality of flocculent gels to grow in the gel water;

a filtering unit, for removing the flocculent gels in the gel water, having a third inlet end fluidly connected with the second outlet end of the mixing piping and a third outlet end; and an outlet piping, having a fourth inlet end and a fourth outlet end, fluidly connected with the third outlet end of the filtering unit and the water-purification equipment, respectively.

In one embodiment of the pretreatment system for recycling exhaust water according to the present invention, the doping unit can include a chemical tank and a doping pump for feeding the chemicals from the chemical tank into the inlet piping.

According to the present invention, the coarse interior of the mixing piping can be formed as a block wave-type interior, a sinusoidal wave-type interior, a triangular wave-type interior and any the like. Preferably, the mixing piping can be a worm pipe.

Preferably, the mixing piping can be wound around the filtering unit, or can be arranged by a serpentine style with a plurality of abrupt bent; for enhancing the in-pipe shearing to assist the forming of turbulent flow.

In one embodiment of the present invention, the mixing piping can be made as a pipe filled with interior stuffing for preventing laminar flow inside the pipe; thus thorough mixing between the exhaust water and the chemicals can be achieved.

In one embodiment of the present invention, the filtering unit is an auto reverse-washing multi-media sand tank or the like filtering device. Typically, the sand tank can have three layers: a 5 mm–20 mm pebble bottom layer, a 1 mm–3 mm coarse crystal sand middle layer, and a 0.5 mm–1.5 mm fine crystal sand upper layer. The gel water is firstly introduced to the bottom layer, through the middle layer, and finally flows out of the tank from the upper layer.

In one embodiment of the present invention, the pretreatment system for recycling exhaust water can further include a buffer tank fluidly inter-connected between the second outlet end of the mixing piping and the third inlet end of the filtering unit, for growing the flocculent gels. In the buffer tank, slow mixing of the chemicals and the exhaust water can be processed for a substantial duration of time. Preferably, the gel water is introduced into the buffer tank by a tangential direction; so that the gel water can circulate gradually inside the buffer tank. Preferably, the gel water is led into the buffer tank from a bottom thereof and led out of the buffer tank from a top thereof. In the embodiment, the buffer tank can be a cylindrical tank with a diameter-to-height ratio between 1 and 0.1. The gel water is preferably to flow in the buffer tank for 1 to 10 minutes.

In one embodiment of the present invention, the pretreatment system for recycling exhaust water can further include at least a filter fluidly inter-connected between the third outlet end of the filtering unit and the fourth inlet end of the outlet piping, for protecting the water-purification equipment. The filter can include only a 5-$\mu$m filter, or a 5-$\mu$m filter and a 1-$\mu$m filter.

Further, on one embodiment of the present invention, the outlet piping of the pretreatment system for recycling exhaust water can include a monitoring sub-piping fluidly deviated from the outlet piping for monitoring a modified silt density index of the clean waterflowing through the outlet piping. The monitoring sub-piping further includes a pressure-adjusting unit and a standard membrane filter located downstream of the pressure-adjusting unit, and an outlet end of the standard membrane filter forming a drip outlet of the monitoring sub-piping thereof.

The modified silt density index (MSDI) for expressing a level of pollution upon a substantial amount of sample water from the outlet piping can be derived as:

$$MSDI = \frac{1}{t_E} \times 100$$

where $t_E$ is a duration needed for a 100-ml of sample water passing a standard membrane filter to achieve a dripping rate lower than 15 drops per 5 seconds under 30 psi. Preferably, the standard membrane filter is a 0.45-$\mu$m membrane filter.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to a pretreatment method and a pretreatment system for recycling exhaust water. In the following description, numerous details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

In the following description, elements or blocks that carry the same function will be labeled with the same name and number for simplifying the description.

Figure 1:
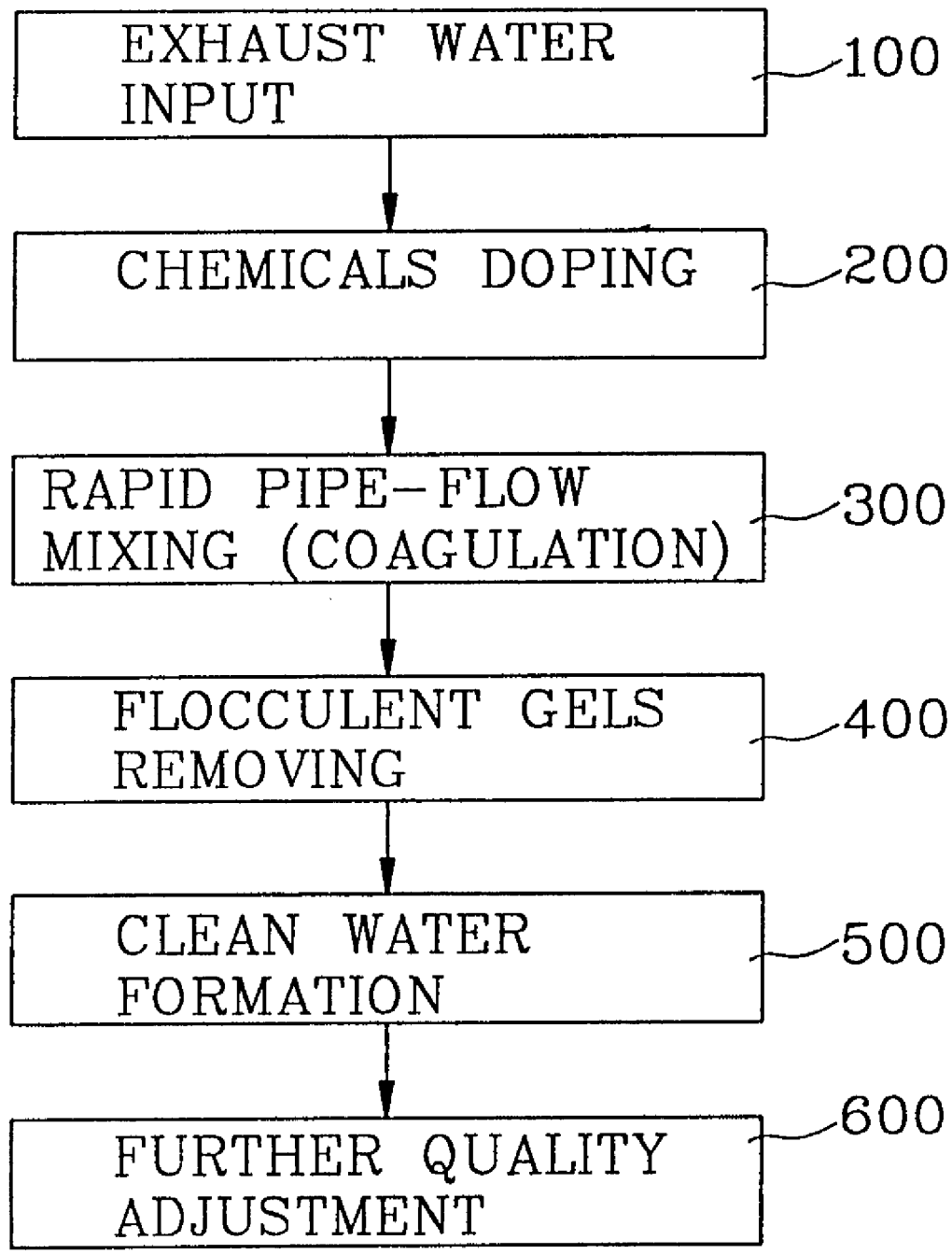
FIG. 1 is a flow chart of a first embodiment of the pretreatment method for recycling exhaust water in accordance with the present invention.

The pretreatment method for recycling exhaust water in accordance with the present invention is used to purify the exhaust water and to generate clean water for further supplying to a water-purification equipment. Referring to FIG. 1, a first embodiment of the pretreatment method is firstly to introduce the exhaust water 100 and to add a substantial amount of chemicals 200 to form a gel water. The gel water will grow a plurality of flocculent gels. The flocculent gel is formed with a pollutant inside and chemical gel surrounding, and the size of the flocculent gel increases as the reaction time increases. To completely wrap all pollutants by gels, thorough mixing between the exhaust water and the doped chemicals is necessary.

According to the present invention, the chemicals used for forming the flocculent gels with the exhaust water can be $Al_2(SO_4)_3 \cdot 18H_2O$, PAC, $FeCl_3$, and any chemical available in the art.

Secondly, a rapid pipe-flow mixing (coagulation) 300 is applied to the gel water, by flowing the gel water through a mixing piping. In the mixing piping, the gel water is stirred by a plurality of turbulent structures located inside the mixing piping for forming a plurality of flocculent gels. According to the present invention, the mixing piping is used to simulate a series of in-pipe micro CSTR's for forming a series of turbulent regions to thoroughly mix the exhaust water and the chemicals.

In the prior art, a rapid mixing facility usually needs a large space to install an open CTSR. On the other hand, in the present invention, the mixing piping with a plurality of internal turbulent structures can successfully form a series of in-pipe or closed micro CSTR's. By providing each micro CSTR's, a turbulent region can be formed to help mix the flow of the exhaust water and the chemicals. The turbulent structures can be achieved by providing coarse interior to the mixing piping. Preferably, the mixing piping can be formed by worm pipes. Cross sections for the worm pipes can be a block-wave pattern, a sinusoidal-wave pattern, a triangular-wave pattern, or any pattern the like.

According to the present invention, in order to provide in-pipe shearing to assist the stirring between the chemicals and the exhaust water, the mixing piping can also be arranged to have a repeatedly bent appearance, or to surround the exterior of a filtering unit described below.

Also, as an alternative, the mixing piping can be made as a pipe filled with interior stuffing for preventing laminar flow inside the pipe.

Preferably, the duration for the gel water to flow through the mixing piping can be between 5 and 60 seconds.

Thirdly, a flocculent gels removing process 400 is applied by leading the gel water through a filtering unit for filtering out the flocculent gels of the gel water and forming the output clean water 500. The filtering unit can be an auto reverse-washing multi-media sand tank or the like filtering device. Typically, the sand tank can have three layers: a 5 mm–20 mm pebble bottom layer, a 1 mm–3 mm coarse crystal sand middle layer, and a 0.5 mm–1.5 mm fine crystal sand upper layer. The gel water is firstly introduced to the bottom layer, through the middle layer, and finally flows out of the talk from the upper layer.

After removing the flocculent gels in the gel water 400, clean water is formed 500 and can be led to the water-purification equipment for further water quality adjustment 600.

In the embodiment shown in FIG. 1, by properly arranging the mixing piping and the filtering unit, most of flocculent gels can be removed; i.e., most of the pollutants and particles in the exhaust water can be removed.

Figure 2:
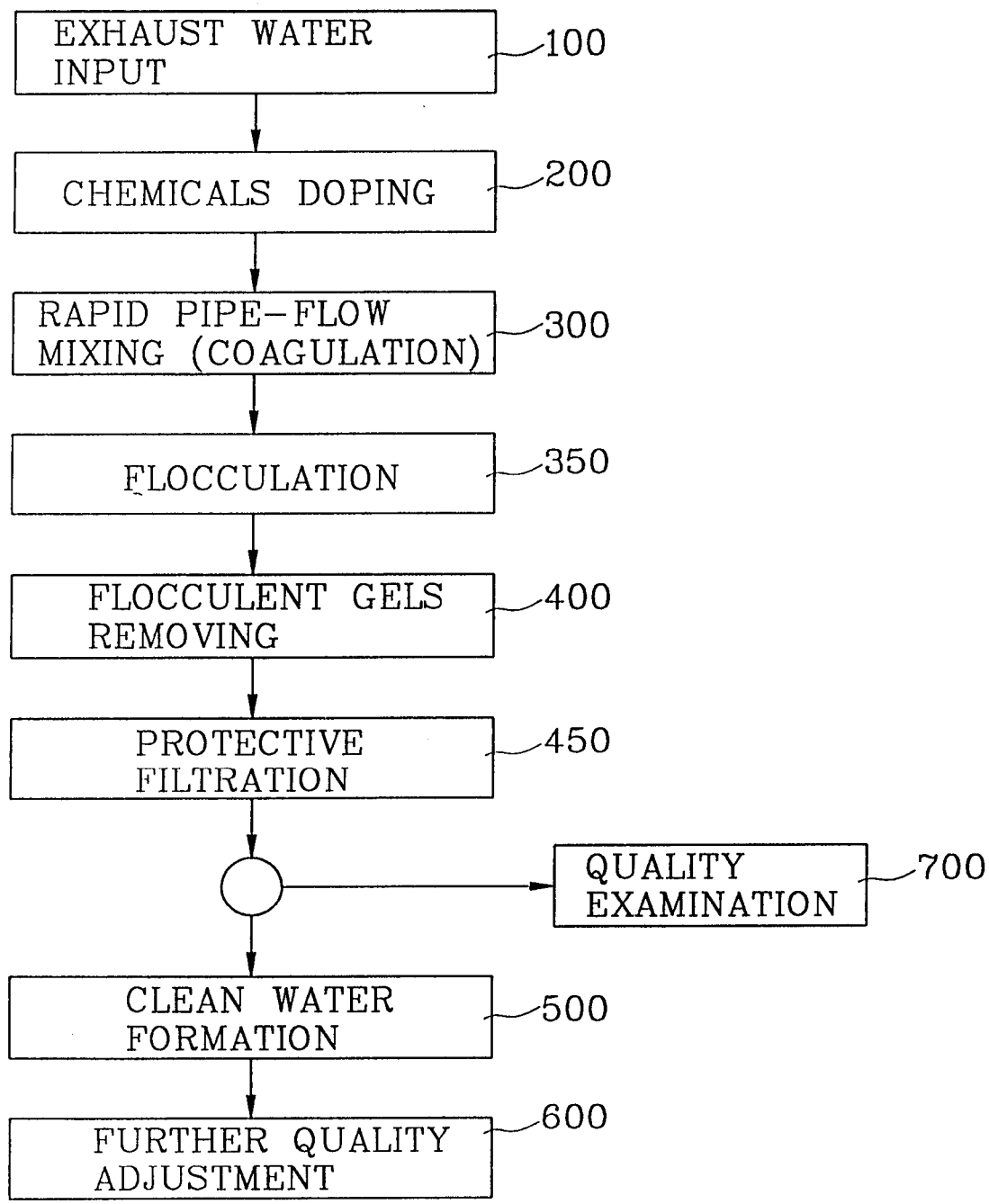
FIG. 2 is a flow chart of a second embodiment of the pretreatment method for recycling exhaust water in accordance with the present invention.

Referring now to FIG. 2, compared with the first embodiment shown in FIG. 1, a second embodiment of the present invention includes a flocculation 350 step between the rapid pipe-flow mixing 300 and the flocculent gels removing 400. In the flocculation 350 step, the gel water is led through a buffer tank for growing the flocculent gels in the gel water. In the buffer tank, slow mixing of the chemical and the exhaust water is processed for a substantial duration of time and thus for allowing the flocculent gels to grow to a substantial size that can be easily removed by the filtering unit.

Preferably, the gel water is introduced into the buffer tank by a tangential direction; so that the gel water can circulate gradually inside the buffer tank. Preferably, the gel water is led into the buffer tank from a bottom thereof and led out of the buffer tank from a top thereof. In the embodiment, the buffer tank can be a cylindrical tank with a diameter-to-height ratio between 1 and 0.1. The gel water is preferably to flow in the buffer tank for 1 to 10 minutes.

As shown in FIG. 2, a protective filtration 450 step is included between the flocculent gels removing 400 and the clean water formation 500. This step has an advantage to prevent any residual pollutant to invade the high-cost downstream water-purification equipment. In protective filtration 450, the gel water is led through at least a filter. The filter can include only a 5-$\mu$m filter, or a 5-$\mu$m filter and a 1-$\mu$m filter.

Comparing the first embodiment method shown in FIG. 1 and the second embodiment method shown in FIG. 2, it is obvious that, by applying the second embodiment method, a larger space and higher cost are needed. However, the second embodiment can have a larger exhaust water-treating capacity.

Also shown in FIG. 2, for monitoring the purification result of the pretreatment method, a quality examination 700 step can be included after the protective filtration 450. In the present invention, a modified silt density index (MSDI) is introduced to scale the silt density of the exhaust water. The modified silt density index (MSDI) for expressing a level of pollution upon a substantial amount of sample water can be derived as:

$$MSDI = \frac{1}{t_E} \times 100$$

where $t_E$ is a duration needed for a 100-ml of sample water passing a standard membrane filter to achieve a dripping rate lower than 15 drops per 5 seconds under 30 psi. Preferably, the standard membrane filter is a 0.45-$\mu$m membrane filter.

Figure 3:
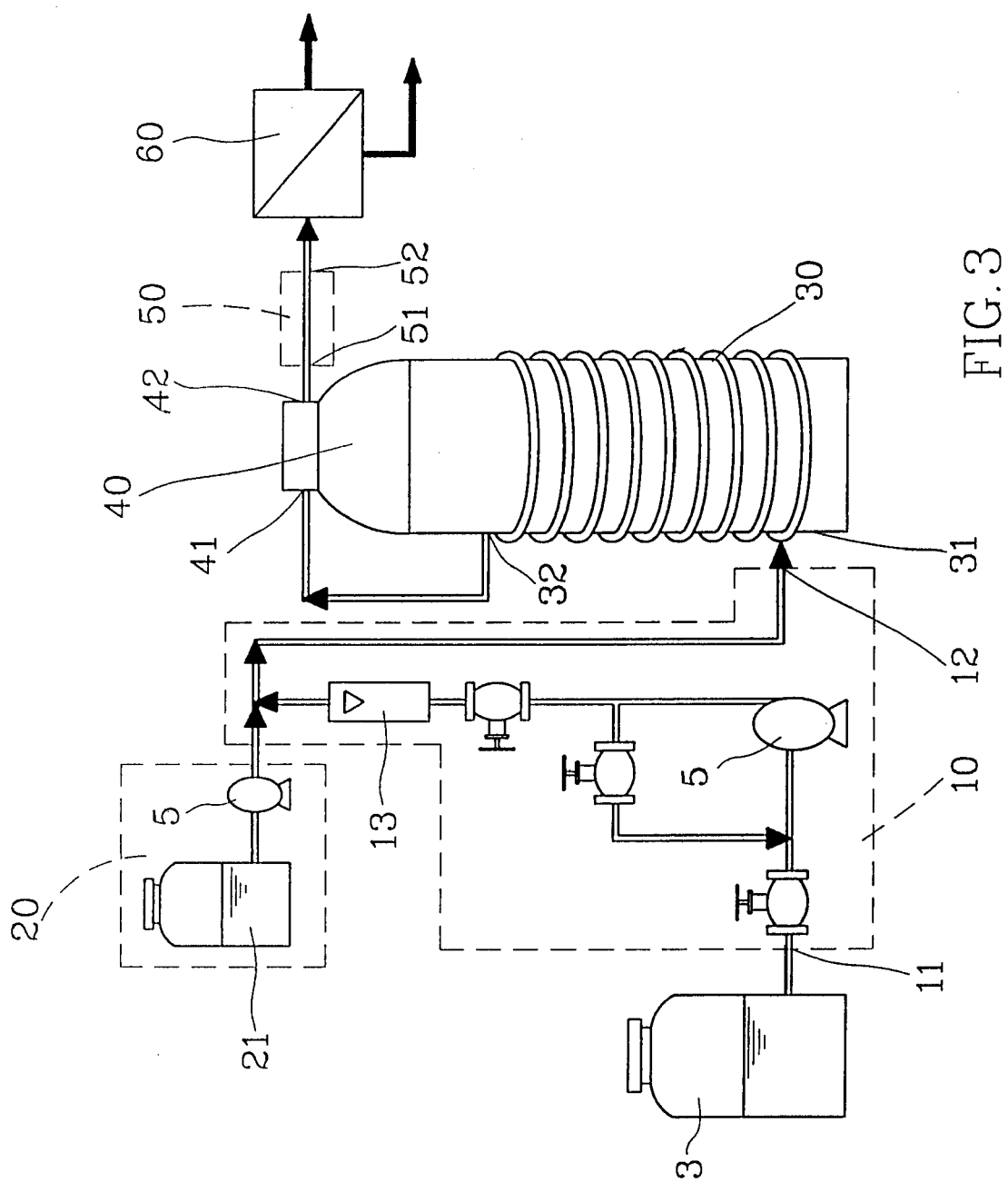
FIG. 3 is a schematic view of a first embodiment of the pretreatment system for recycling exhaust water in accordance with the present invention.

Referring now to FIG. 3, a first embodiment of the pretreatment system for recycling exhaust water in accordance with the first pretreatment method described above related to FIG. 1 is shown. The pretreatment system includes an inlet piping 10, a doping unit 20, a mixing piping 30, a filtering unit 40, and an outlet piping 50.

The inlet piping 10 has a first inlet end 11 for introducing the exhaust water 3 into the inlet piping 10, a first outlet end 12, a pump 5 for introducing the exhaust water, a in-pipe flow gauge 13 for monitoring the in-pipe water flow rate, and related pressure-adjusting and piping elements.

The doping unit 20 for adding chemicals into the inlet piping 10 to mix with the exhaust water 3 for forming a gel water can include a chemical tank 21 for storing the chemicals and a pump 5 for feeding the chemicals from the chemical tanks 21 to the inlet piping 10.

The mixing piping 30 has a second inlet end 31 fluidly connected with the first outlet end 11 of the inlet piping 10 and a second outlet end 32. The mixing piping 30 includes coarse interior for generating a plurality of turbulent mechanisms to form plenty of turbulent-flow region inside the mixing piping 30 for helpfully promoting a plurality of flocculent gels to grow in the gel water by thoroughly mix the exhaust water 3 and the chemicals.

Figure 4:
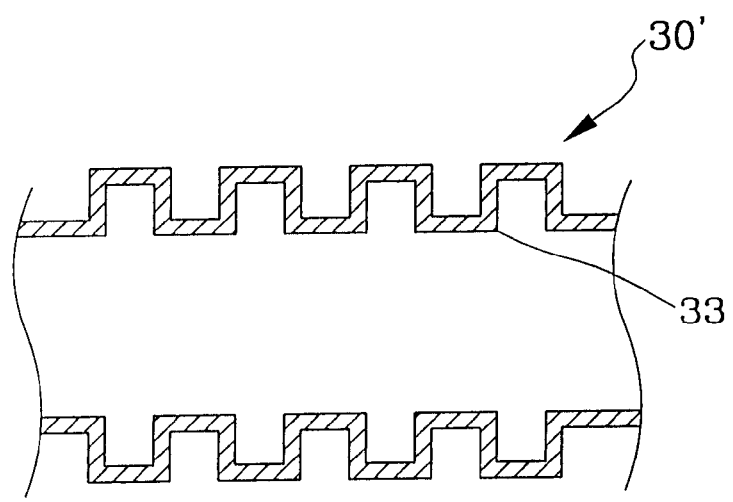
FIG. 4 is a cross-sectional view showing part of a mixing piping in accordance with the present invention.

According to the present invention, the coarse interior 33 of the mixing piping 30' can be formed as a block wave-type interior (FIG. 4), a sinusoidal wave-type interior, a triangular wave-type interior and any the like. By providing the coarse interior 33, the pipe flow inside the mixing piping 30' will experience a series of turbulent regions, so that the chemicals and the exhaust water of the gel water can be well blended to have gels formed outside each particles and pollutants of the exhaust water. Preferably, the mixing piping 30 can be a worm pipe or the like.

Figure 5:
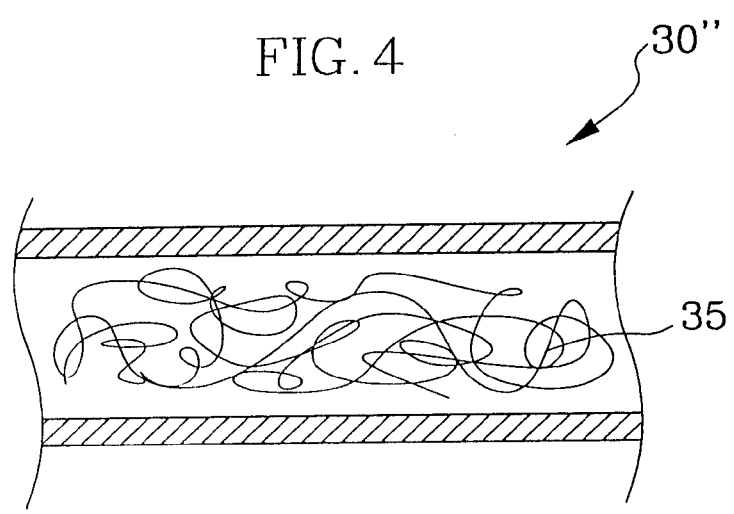
FIG. 5 is a cross-sectional view showing part of another mixing piping in accordance with the present invention.

Referring now to FIG. 5, according to the present invention, the mixing piping 30" can also be made as a pipe filled with interior stuffing 35. By providing the interior stuffing 35 inside the mixing piping 30", the pipe flow can be effectively disturbed and will not formulate a laminar flow inside the pipe. Thus, thorough mixing between the exhaust water and the chemicals can also be achieved.

Preferably, the mixing piping 30 can be arranged to wind around the filtering unit 40 as shown in FIG. 3, for saving the installation space and for enhancing the shearing inside the pipe, in which the shearing will be benefit to generating turbulent flow.

Figure 6:
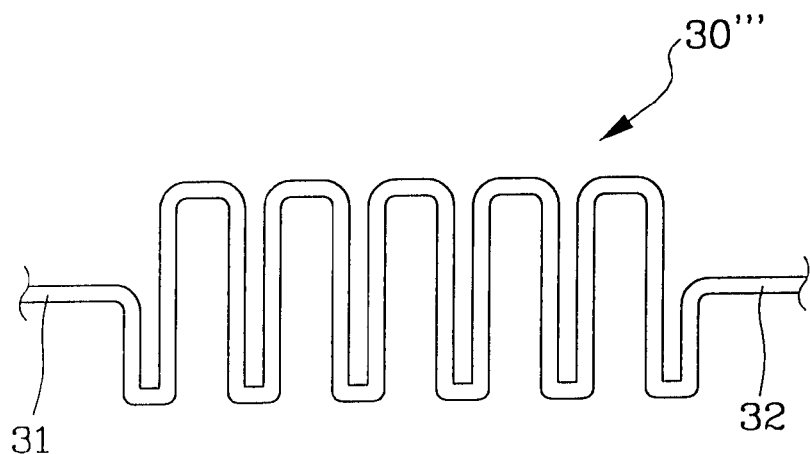
FIG. 6 is a schematic view of a serpentine mixing piping in accordance with the present invention.

Referring now to FIG. 6, the mixing piping 30''' can also be serpentine configuration with a plurality of abrupt bends, for enhancing the in-pipe shearing to assist the forming turbulent flow.

As shown in FIG. 3, the filtering unit 40 for removing the flocculent gels in the gel water has a third inlet end 41 fluidly connected with the second outlet end 32 of the mixing piping 30 and a third outlet end 42. In the present invention, the filtering unit 40 can be an auto reverse-washing multi-media sand tank or the like filtering device. Typically, the sand tank can have three layers: a 5 mm–20 mm pebble bottom layer, a 1 mm–3 mm coarse crystal sand middle layer, and a 0.5 mm–1.5 mm fine crystal sand upper layer. The gel water is firstly introduced to the bottom layer, through the middle layer, and finally flows out of the tank from the upper layer.

The outlet piping 50 has a fourth inlet end 51 and a fourth outlet end 52, fluidly connected with the third outlet end 42 of the filtering unit 40 and the water-purification equipment 50, respectively. The water-purification equipment 50 is used to further adjust the water quality, and can be a reverse osmosis water-purification device, a active carbon filtration device, or the like water-purification device.

Figure 7:
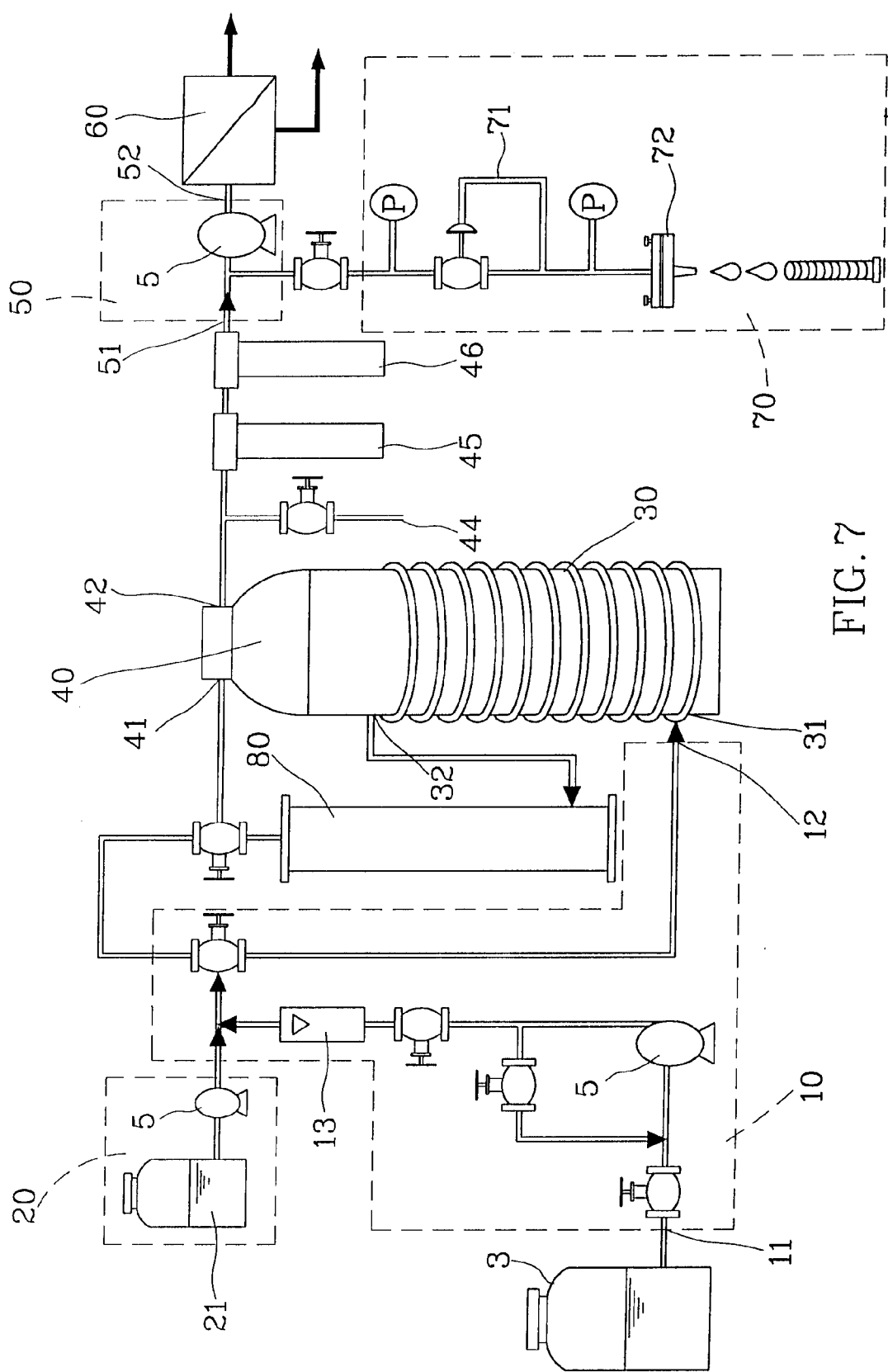
FIG. 7 is a schematic view of a second embodiment of the pretreatment system for recycling exhaust water in accordance with the present invention.

Referring now to FIG. 7, a second embodiment of the pretreatment system for recycling exhaust water in accordance with the second pretreatment method described above related to FIG. 2 is shown. By comparing the first embodiment system shown in FIG. 3 and the second embodiment system shown in FIG. 7, it is found that a buffer tank 80 is included to be fluidly inter-connected between the second outlet end 32 of the mixing piping 30 and the third inlet end 41 of the filtering unit 40, for acting as a slow mixing mechanism to grow the flocculent gels. In the buffer tank 80, slow mixing of the chemicals and the exhaust water can be processed for a substantial duration of time. Preferably, the gel water is introduced into the buffer tank 80 by a tangential direction; so that the gel water can circulate gradually inside the buffer tank 80. Preferably, the gel water is led into the buffer tank 80 from a bottom thereof and led out of the buffer tank 80 from a top thereof. In the embodiment, the buffer tank 80 can be a cylindrical tank with a diameter-to-height ratio between 1 and 0.1. The gel water is preferably to flow in the buffer tank 80 for 1 to 10 minutes.

As shown in FIG. 7, the pretreatment system for recycling exhaust water can further include at least a filter fluidly inter-connected between the third outlet end 42 of the filtering unit 40 and the fourth inlet end 51 of the outlet piping 50, for protecting the water-purification equipment 60. The filter can include only a 5-μm filter 45, or a 5-μm filter 45 and a 1-μm filter 46. The requirement of installing a filter 45 or 46 can be determined from the sample water taken from a sampling outlet 44 fluidly connected with the third outlet end 42.

Further, in the second embodiment of the present invention shown in FIG. 7, the outlet piping 50 can include a monitoring sub-piping 70 fluidably deviated from the outlet piping 50 for monitoring a modified silt density index of the clean water flowing through the outlet piping 50. The monitoring sub-piping 70 further includes a pressure-adjusting unit 71 and a standard membrane filter 72 located downstream of the pressure-adjusting unit 71, and an outlet end of the standard membrane filter 72 forming a drip outlet of the monitoring sub-piping 70 thereof.

The modified silt density index (MSDI) for expressing a level of pollution upon a substantial amount of sample water from the outlet piping 50 can be derived as:

$$MSDI = \frac{1}{t_E} \times 100$$

where $t_E$ is a duration needed for a 100-ml of sample water passing the standard membrane filter 72 to achieve a dripping rate lower than 15 drops per 5 seconds under 30 psi. Preferably, the standard membrane filter 72 is a 0.45-μm membrane filter.

According to the present invention, the pretreatment system and pretreatment method for recycling exhaust water can purify the exhaust water to a water quality acceptable to ordinary water-purification equipment. By providing a mixing piping with coarse interior, a series of close micro CSTR's can be established for thoroughly blending the exhaust water and doping chemicals. By providing a modified silt density index, the pollution variation upon various exhaust water samples can be easily monitored.

While the present invention has been particularly shown and described with reference to preferred embodiments, it will be understood by those skilled in the art that various changes in form and detail may be without departing from the spirit and scope of the present invention.

What is claimed is:

1. A pretreatment method for recycling exhaust water, which purifies the exhaust water to generate clean water for further supplying to water-purification equipment, comprising:
    a) forming a gel water by combining the exhaust water and chemicals;
    b) flowing the gel water through a mixing piping;
    c) stirring the gel water by a plurality of turbulent structures located inside the mixing piping for forming a plurality of flocculent gels;
    d) flowing the gel water through a filtering unit for filtering out the flocculent gels and forming output clean water; and
    e) introducing the output clean water to the water-purification equipment.

2. The pretreatment method for recycling exhaust water according to claim 1, wherein said mixing piping has a serpentine configuration.

3. The pretreatment method for recycling exhaust water according to claim 1, wherein said turbulent structures comprise coarse walls for generating turbulent flow inside said mixing piping.

4. The pretreatment method for recycling exhaust water according to claim 1, wherein said mixing piping is filled with interior stuffing for preventing laminar flow inside the pipe.

5. The pretreatment method for recycling exhaust water according to claim 1, wherein said filtering unit comprises an auto reverse-washing multi-media sand tank.

6. The pretreatment method for recycling exhaust water according to claim 1, comprising the additional step between said step b and said step d, of flowing said gel water through a buffer tank for growing said flocculent gels.

7. The pretreatment method for recycling exhaust water according to claim 6, comprising the step of leading said gel water into said buffer tank in a tangential direction.

8. The pretreatment method for recycling exhaust water according to claim 6, comprising the additional steps of leading said gel water into said buffer tank from a bottom thereof and leading out of said buffer tank from a top thereof.

9. The pretreatment method for recycling exhaust water according to claim 1, comprising the additional step between said step d and said step e, of flowing said gel water through at least a filter for protecting said water-purification equipment.

10. The pretreatment method for recycling exhaust water according to claim 9, wherein said filter includes a 5-$\mu$m filter.

11. The pretreatment method for recycling exhaust water according to claim 9, wherein said gel water is led through a 5-$\mu$m filter and a 1-$\mu$m filter.

12. The pretreatment method of claim 1 comprising the additional step of monitoring the modified silt density index (MSDI) of the output clean water, wherein the MDSI is determined by $$MSDI = \frac{1}{t_E} \times 100$$

where $t_E$ is a duration needed for a substantial amount of sample water passing a standard membrane filter to achieve a dripping rate lower than 15 drops per 5 seconds under 30 psi.

13. The pretreatment method according to claim 12, wherein said standard membrane filter is a 0.45-$\mu$m membrane filter.

* * * * *